June 19, 1951      G. D. LEISTER      2,557,192
FOLDING PORTABLE GIN POLE
Filed Feb. 7, 1949
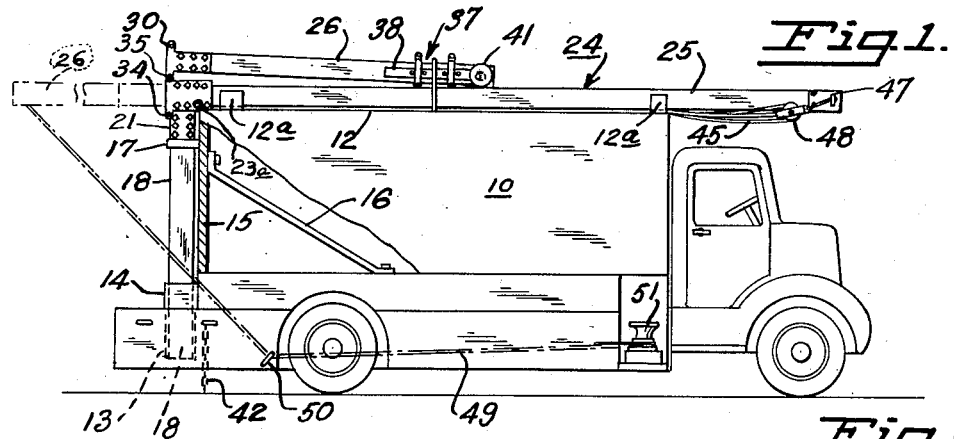
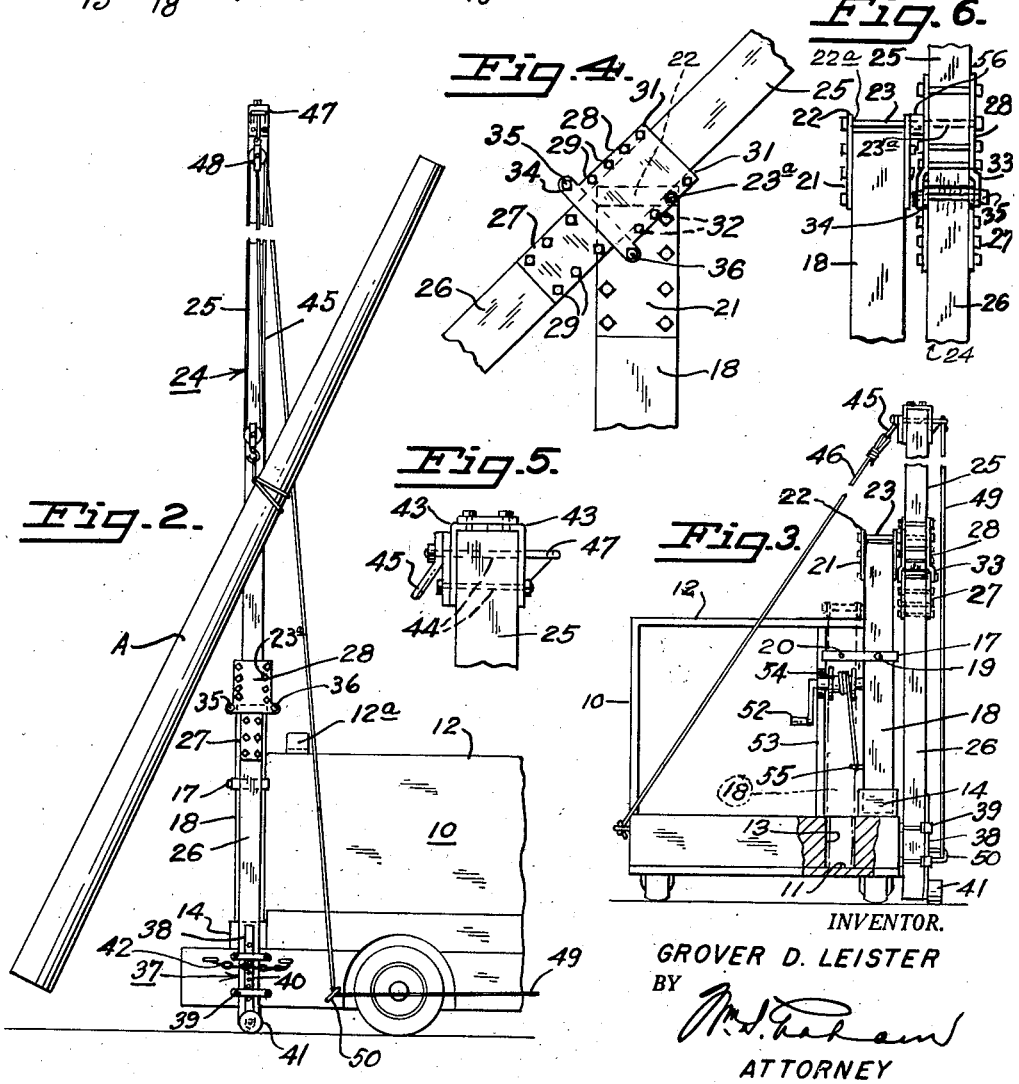
INVENTOR.
GROVER D. LEISTER
BY
ATTORNEY

Patented June 19, 1951

2,557,192

UNITED STATES PATENT OFFICE 2,557,192

FOLDING PORTABLE GIN POLE

Grover D. Leister, Redwood City, Calif.

Application February 7, 1949, Serial No. 75,030

6 Claims. (Cl. 254—139.1)

1

This invention relates to folding portable gin poles, and more particularly relates to such portable gin poles mountable upon the chassis of a vehicle or truck.

Portable gin poles have been heretofore known, and the novelty of the present invention is to provide a portable gin pole mounted at one side of the rear of a vehicle chassis which, when erected, is efficient for operation close to street curb lines in cities, and is adapted for folding over the top of the vehicle for garage storage.

Especial adaptability of a hoisting apparatus of the gin pole type is found in the setting of relatively long heavy poles in excavations, such as poles for carrying telephone and electric wires, especially along curb lines. It has been found desirable to mount such a gin pole as a facility on a service or equipment truck carrying tools and supplies, which makes it advisable to place the vehicle in a garage for safekeeping when not in use. Obviously it is not practical to build the garage to accommodate the full length nor the full height of a gin pole, yet the normal length and height of a gin pole must be maintained for efficient operation.

Therefore, a broad object of this invention is to provide a foldable gin pole mounted at one side at the rear end of a vehicle chassis or truck.

Another object is to provide in a foldable gin pole means in a vehicle chassis for relative vertical adjustment of the height of the gin pole support.

A further object is to provide in a foldable portable gin pole, a vertically adjustable foot roller so that the gin pole may be moved for small distances on the foot roller while it is erect and at times when it may be supporting a heavy weight such as a telegraph or telephone pole, which has been raised out of an excavation or preparatory to placement in an excavation.

With the foregoing and other objects in view, one form in which the invention may be exemplified is described herein and illustrated in the accompanying drawing and pointed out in the claims hereto appended.

To more clearly comprehend the invention reference is directed to the accompanying drawing in which:

Fig. 1 is a side elevation of truck body and folded gin pole.

Fig. 2 is a side elevation of a portion of truck body showing gin pole erected.

Fig. 3 is an end view of truck body and gin pole mounted thereon, the boom of the pole being shown fragmentarily.

2

Fig. 4 is an enlarged fragmentary side view of the hinge portion of the gin boom.

Fig. 5 is an enlarged fragmentary view of one side of the top portion of the gin boom.

Fig. 6 is an enlarged fragmentary view of a portion of Fig. 3.

Referring to the accompanying drawing in which like reference characters indicate corresponding parts in the several views, 10 indicates generally a motor truck body having the usual chassis providing a truck bed or floor 11 and a suitable reinforced top 12 which is provided with brackets 12a relatively spaced at opposite end portions of the top and substantially within the vertical plane of the side wall of the truck body. While the sides and top are shown as enclosed, it is to be understood that this is a mere matter of preference and that the top 12 and sidewall may if desired be an open frame.

For purposes to be described, the bed or floor of the truck is provided spaced from one side and adjacent its rear end, with a recess 13 and a closely contiguous open preferably rectangular socket 14, the bottom of which is upraised from the bottom of recess 13 by being mounted on the upper face of the floor of the truck. The socket 14 is closely adjacent a side of the truck bed in substantial alignment with the plane of one side wall of the truck. The side wall of the truck body is reinforced in any suitable manner, as by vertical brace member 15 and diagonal strut 16.

To the upper portion of the vertical brace 15 or to the rear end of the side wall of the truck body is fixedly secured a horizontal elongated open rectangular strip or loop 17, one end of the loop opening overlying the open socket 14 and providing an upper guide and support for an upright supporting stud 18 when the bottom of the stud is mounted in the socket. The other end of the loop opening overlies the recess 13 of the truck bed and provides a guide and support for the stud 18 when the bottom of the stud is demounted from the socket and reposes in the recess 13 as will be described. Toward the side of the truck the strap loop 17 is provided with a hole to receive a removable bolt 19 which, when the supporting stud is in the socket 14, also passes through the upright stud. If desired, an additional hole 20 may be provided adjacent the opposite end of the strap loop to secure the stud when it is moved into the recess 13.

The upright supporting stud 18 is a relatively heavy timber, preferably rectangular in horizontal transverse section so that its foot may conveniently snugly, but removably, fit in socket 14 and through the open loop 17, whereby it will be staid against rotation on its vertical axis. At the upper terminal end of the stud, opposite sides thereof which are parallel with the longitudinal sides of the truck body are provided with reinforcing supporting side plates 21 fixedly secured thereto by bolts, each plate 21 having at its upper end an extension ear 22 extending beyond the upper end of the stud 18, whereby the supporting height of the stud is made slightly greater than the height of the vehicle top 12 measured from the bottom of the recess 13. Each extended ear 22 is provided with a perforation 22a, the perforations being axially aligned and preferably inset from the vertical plane of the forward and rearward faces of the stud, whereby the axis of said perforations is transversely to the truck body. Mounted through said perforations is a boom pivot 23 having an extension 23a of a length to extend beyond the stud 18 at that side wall of the stud which is more nearly adjacent to and parallel with the longitudinal side of the truck. Pivotally mounted on said bolt extension 23a at the upper portion of the stud is a hingedly jointed and foldable gin boom generally indicated 24.

The gin boom 24 has an upper or mast section 25 and lower or leg section 26 hingedly jointed relatively for folding, each section having hinge plates or butts on its opposite sides at the hingedly jointed adjacent ends, as indicated 27 for the leg section and 28 for the mast section. These plates are fixedly secured to the respective boom sections by suitable bolts or rivets 29. The plates on one section, as illustrated 27 on the leg section, are flat against the opposite faces of the leg section and are of substantially similar width as the base section, and are provided with laterally extended perforated ears 30 at opposite side edges adjacent the hinge end of the plate. The plates on the other section, as illustrated 28 of the mast section, are flat against the opposite faces of the mast section, but are preferably wider than the mast section so as to provide free extended longitudinal edge portions 31 having perforations 32 through which bolts 29 may pass exterior of the mast section.

The terminal hinge edge of each plate 28 of the mast is flanged outwardly as a skirt 33 which overhangs the adjacent end of the plates 27 of the leg section, the ends of the skirt portion being also provided with laterally extended ears 34 having perforations which, when the two sections of the boom are in alignment, register for receiving bolts 35 and 36. The bolt 35 is the hinge pintle bolt for the jointed sections of the boom, and the other bolt 36 is a removable bolt which locks the two sections in alignment, and when removed, permits relative hinged folding of the boom sections upon hinge pintle 35.

The upper section 25 or mast of the boom is pivotally mounted on the supporting stud 18 by passing the previously described extended portion of the boom pivot bolt 23 through one of the perforations 32 in the edge portions 31 of each of the opposed plates 28 f the mast section. In this connection it is to be noted that the hinge bolt 35 and the boom pivot 23 are on opposite sides of the boom, and that the hinge bolt 35 is substantially in a plane with the opposed jointed end faces of the boom member when the sections of the boom are aligned, whereas the boom pivot is spaced from said face ends a distance substantially equal to the width of stud 18, so that the hinge pivot and boom pivot are relatively adjacently spaced at the head of the vertical stud and are parallel and perpendicular to the plate and the stud. Several advantages are accomplished by this arrangement of the respective pivots; in operation the greatest stress is placed on the boom pivot and it is thereafter advantageous that such stress be removed from the joint of the two boom sections by having the boom pivot 23 substantially in the plane of one face of stud support 18 and connected in spaced relation to the joint end of the mast; the joint end of the mast is thereby substantially in the plane of the opposite face of the stud when the mast is lowered or folded as shown in Fig. 1.

Also, in providing that the hinge pivot be on the opposite face of the mast from the boom pivot, and substantially in the horizontal plane of the joint of the leg member and mast, the leg member and mast may be relatively folded so that the faces of the jointed ends and the outer rear face of the stud are all substantially in the same plane vertically. so that the hinged end portions of the folded leg and mast of the boom do not extend rearwardly of the stud.

The leg member 26 of the boom is of a length so that when the gin pole is erected vertically in operation as in Fig. 2, the foot of the leg member is substantially in contact with the ground surface, so that when weight is placed upon the gin pole and the tires and springs of the vehicle depress somewhat the foot of the boom is based on the ground. This length, however, may be partially made up by an adjustable foot member 37, having an arm 38 longitudinally slidable within straps 39 and vertically adjustable with relation to the lower end of the base member in any suitable manner, as by pins and holes 40, the terminal end of the foot having a roller or wheel 41, since it is frequently necessary to move the truck and gin pole a short distance away from or toward a pole excavation or other hoisting position while the gin pole is bearing weight. When the boom is erected the base portion of leg section 26 is secured in upright position by a chain 42 releasably secured to the truck bed.

The top end of the mast is provided with means for attachment of suitable hoisting tackle, and as exemplified, comprises plates forming a saddle 43 extending across the top face of the mast and extending downwardly contacting the sides of the mast and suitably secured by bolts 44, one of which may extend through the side plates and mast and have at one end a connection 45 for a supporting guy cable 46, and have at its opposite end a loop 47 for attachment of conventional pulley blocks 48 and tackle rig 49 which latter passes through guide member 40 and is wound upon a power winch 51 operated by the motor of the vehicle.

Referring again to stud 18, its height dimension is sufficiently greater than the height of the top portion 12 of the truck body so that when the foot of the stud is at its normal upraised operative position resting on the truck floor in socket 14, the upper end of the stud is substantially above the level of top 12 of the truck body. The recess 13 is of such depth that when the foot of the stud 18 is in the recess 13 below the floor the upper end of the stud is substantially level with the truck top 12 so that the boom pivot 23 is slightly above the top 12 sufficiently so that the mast section of the boom may, when folded, rest in the brackets 12a and be closely parallel to the top 12.

Suitable means are provided to lift the supporting stud from the recess 13 to the upraised socket 14, and vice versa. Such a means may comprise a suitable hand crank 52 rotatably mounted on the support 53 of the car body, the crank on its shaft having a small drum 54 about which is wrapped a line which is suitably connected to the lower portion of the stud as at 55.

In describing operation and referring to Fig. 1 which illustrates the folded inoperative position of the gin pole for storage of the truck in a garage, it is to be noted that the foot of stud 18 is in the recess 13, as shown in dotted line in Fig. 3, and the upper end of the stud is sufficiently removed laterally inwardly from the adjacent side wall of the truck so that the folded boom 24 will repose in the brackets 12a overlying the top and within the plane of the side wall of the truck, the boom pivot bolt 23 being substantially at the same level as, but slightly above, the top 12. At this lowered position of the stud it is convenient to unfold the base member 26 of the boom by swinging it on the hinge pivot bolt 35 until it is aligned with the reposing mast portion, as indicated by the dotted line in Fig. 1, thus bringing the hinged end faces of mast 25 and leg member 26 into facial contact, and the perforations of the ears 34 of the skirt of the mast come into overlying register with the perforations of ears 30 of the plate on the leg member, whereupon the removable bolt 36 is inserted and tightened to make the boom an operational aligned single boom member, the respective opposed end faces of the boom coming into facial contact because the end face of the leg member is flush with the terminal end of the plates 27 whereas the mast member terminates at the beginning of the overhanging skirt 33, thereby allowing the end of the leg section to enter between the skirt portion of the plates 28.

When the sections of the boom are thus in alignment the crank 52 and drum 54 are rotated to raise the foot of the stud 18 from its bed recess 13 and its foot end may be manually pushed laterally and dropped into the upraised socket 14 whereupon the bolt 19 of strap 17 is secured in place maintaining the upper end of the stud 18 and the boom pivot 23 substantially above the top 12 of the truck. However, if desired, the positioning of the foot of the stud in the upraised socket 14 may be accomplished in the same manner prior to unfolding the hinged boom section into alignment.

After raising of the aligned boom to an erect or vertical position as shown in Figs. 2 and 3, the free end of reinforcing guide line 46 may be suitably attached to an opposite side of the truck bed for support of lateral stress.

When the boom is erect the lower portion of the leg section is secured against sway under stress of weight by the loop chain 42, and the foot of the leg section is sufficiently close to the ground so that it abuts the ground under stress of weight, or if desired the adjustable foot is adjusted so that the roller 41 bears on the ground surface, whereupon the hoisting tackle 48, 49 may be conventionally operated by the power winch 51 for setting and removing poles from adjacent excavations or for other hoisting purposes. A hoisted pole is indicated A.

Manifestly in order to demount the boom and restore it to its folding position over the top of the truck body it is only necessary to reverse the steps of procedure heretofore outlined with relation to erection of the gin pole.

Since the gin pole is at the side and at the rear end of the truck body, it is to be observed that the gin pole is conveniently operable while the truck is parked parallel with a curb line, thus avoiding blocking of street traffic, and if it is found necessary to move the truck for a short distance while the gin pole is erected and bearing weight, such movement may be accomplished by reason of the foot roller at the bottom end of the boom. From the hinged foldability of the boom and facility of lateral movement of the supporting stud the truck may be traveling at high speed in areas where there are overhead obstructions, such as wires, trees, highway tunnels and underground crossings, as well as conveniently housed in the usual storage garage.

It is believed to be apparent that the extension 23a of the boom pivot would be of such length that when stud 18 is laterally moved from the recess 13 to upraised position in socket 14, the boom 24, being mounted on the extended portion 23a of the boom pivot, is free to swing on said pivot free and clear of the sidewall of the truck body. For this purpose a spacer sleeve 56 may be mounted on the pivot bolt 23 between the stud 18 and boom 24.

Having thus described the invention, what I claim is:

1. In a portable foldable gin pole, the combination of a vehicle truck body, a supporting stud movably mounted adjacent one side and end of the vehicle body and extending upwardly from the floor thereof and having at its upper portion a boom pivot, and a gin pole boom pivotally mounted on the boom pivot, said boom having a lower leg section and an upper mast section relatively hingedly connected, the hinge connection of said sections being on the opposite side of the boom from the boom pivot, and said supporting stud being of greater height dimension than the height of the vehicle body above the floor whereby the top of the stud is selectively positionable above or substantially level with the top by movement of the stud between respective footed positions on the floor and upraised platform.

2. In a portable foldable gin pole, the combination of a vehicle truck body, a supporting stud movably mounted adjacent one side and end of the vehicle body and extending upwardly from the floor thereof and having at its upper portion a boom pivot, and a gin pole boom pivotally mounted on the boom pivot, said boom having a lower leg section and an upper mast section relatively hingedly connected, the hinge connection of said sections being on the opposite side of the boom from the boom pivot, and said supporting stud being of greater height dimension than the height of the vehicle body above the floor whereby the top of the stud is selectively positionable above or substantially level with the top by movement of the stud between respective footed positions on the floor and upraised platform, and a longitudinally adjustable member at the foot of the leg section extendable to the ground for relieving the vehicle of longitudinal load on the gin pole when at a vertical operative position, the adjustable member including at its foot a roller whereby the erected gin pole may be moved along the ground in unison with the vehicle.

3. In a portable foldable gin pole mounted on a vehicle truck body having a floor and a platform upraised from the floor and a top support spaced above the floor and provided with supporting bracket means adjacent a side edge for supporting a folded boom member, a supporting stud movably mounted adjacent one side of the vehicle body and extending upwardly from the floor and having at its upper portion a boom pivot provided with a laterally extended end portion, said stud being movable between a footed position on the floor and an upraised position on the platform, means to raise said stud whereby it may be moved from one of said footed positions to the other, and a gin boom pivotally mounted on the extended portion of the boom pivot and comprising a leg section and a mast section hingedly connected relatively intermediate the ends of the boom, said supporting stud being of greater height dimension above the floor than the height of said top support above the floor, whereby the top of the stud is selectively positionable above or substantially level with the top by movement of the stud between respective footed positions on the floor and upraised platform and whereby, when the stud is at a lowered position, the hingedly folded gin boom may be engaged in said top bracket means.

4. In a portable foldable gin pole mounted on a vehicle truck body having a floor and a platform upraised from the floor and a top support spaced above the floor and provided with relatively spaced supporting brackets adjacent a side edge for supporting a folded boom member, a supporting stud movably mounted adjacent one side of the vehicle body and extending upwardly from the floor and having at its upper portion a boom pivot provided with a laterally extended end portion, said stud being movable between a footed position on the floor and an upraised position on the platform, means to raise said stud whereby it may be moved from one of said footed positions to the other, and a gin boom pivotally mounted on the extended portion of the boom pivot and comprising a leg section and a mast section hingedly connected relatively intermediate the ends of the boom, said supporting stud being of greater height dimension above the floor than the height of said top support above the floor, whereby the top of the stud is selectively positionable above or substantially level with the top by movement of the stud between respective footed positions on the floor and upraised platform and whereby, when the stud is at a lowered position, the folded gin boom may rest in said spaced top brackets, and a longitudinally adjustable member at the foot of the leg section extendable to the ground for relieving the vehicle of longitudinal load on the gin pole when at a vertical operative position, the adjustable member including a roller at its foot whereby the erected gin pole may be moved along the ground in unison with the vehicle.

5. In a portable foldable gin pole apparatus including a vehicle truck body having a floor, an improved means for supporting a gin pole boom, comprising a supporting stud adjacent one side of a rear end portion of the truck body and extending upwardly from the floor thereof, a boom pivot mounted at the upper portion of the stud support and having an end portion extended beyond the side wall of the stud support and beyond the adjacent side of the truck body, and a gin boom pivotally mounted on the extended portion of the boom pivot whereby the boom may be selectively moved pivotally between a vertical position and a parallel position relative to the truck floor, said boom comprising a leg section and a mast section which are hingedly connected adjacent the pivotal mounting of the boom on the stud, whereby, when the mast section of the boom is pivotally moved to parallel the floor of the truck body, the leg section may be folded on the hinge connection to a position overlying and substantially parallel with the mast section, the hinged connection between said leg and mast section being in substantial vertical alignment with the stud support adjacent the rear end and side of the truck body.

6. In a portable gin pole apparatus including a vehicle truck body having a floor and a supporting frame having its top spaced above the floor, an improved means for supporting a gin pole boom, comprising a vertical stud means having its foot movably mounted on the truck floor adjacent the rear end and one side of the truck body, and being movable between a footed position closely adjacent the side of the truck body and a footed position spaced from the side of the truck body, said stud support means having a height above the floor greater than the height of the top of said supporting frame, means to support said stud vertically at said footed positions, a boom pivot mounted at the upper portion of the stud means and having an end portion extended beyond the side wall thereof, whereby, when the stud means is footed closely adjacent the side of the truck body, a gin boom pivotally mounted intermediate its ends on the extended portion of the boom pivot, said boom comprising a leg section and a mast section relatively hingedly connected intermediate the ends of the boom whereby said sections may be selectively relatively aligned or relatively folded parallel, said hinge connection being adjacent the boom pivot at the upper portion of the stud, and releasable means adapted for staying said sections against relative hinged movement when said sections are aligned, the said boom pivot being mounted in the stud means at a sufficient height above the truck body whereby the boom may be pivotally moved between a position vertically paralleling the stud and a horizontal position overlying the top of the supporting frame, and said leg section of the boom being movable on said hinge connection from a position aligned with the mast section to a parallel overlying position relative to the mast section.

GROVER D. LEISTER.

REFERENCES CITED

The following references are of record in the file of this patent:

UNITED STATES PATENTS

| Number | Name | Date |
|---|---|---|
| 1,828,973 | Leister | Oct. 27, 1931 |
| 2,364,851 | Johansen | Dec. 12, 1944 |
| 2,366,378 | Barrett | Jan. 2, 1945 |